F. SEABERG.
DOOR OPERATING MECHANISM.
APPLICATION FILED SEPT. 19, 1908.
1,000,443.
Patented Aug. 15, 1911
2 SHEETS—SHEET 1.
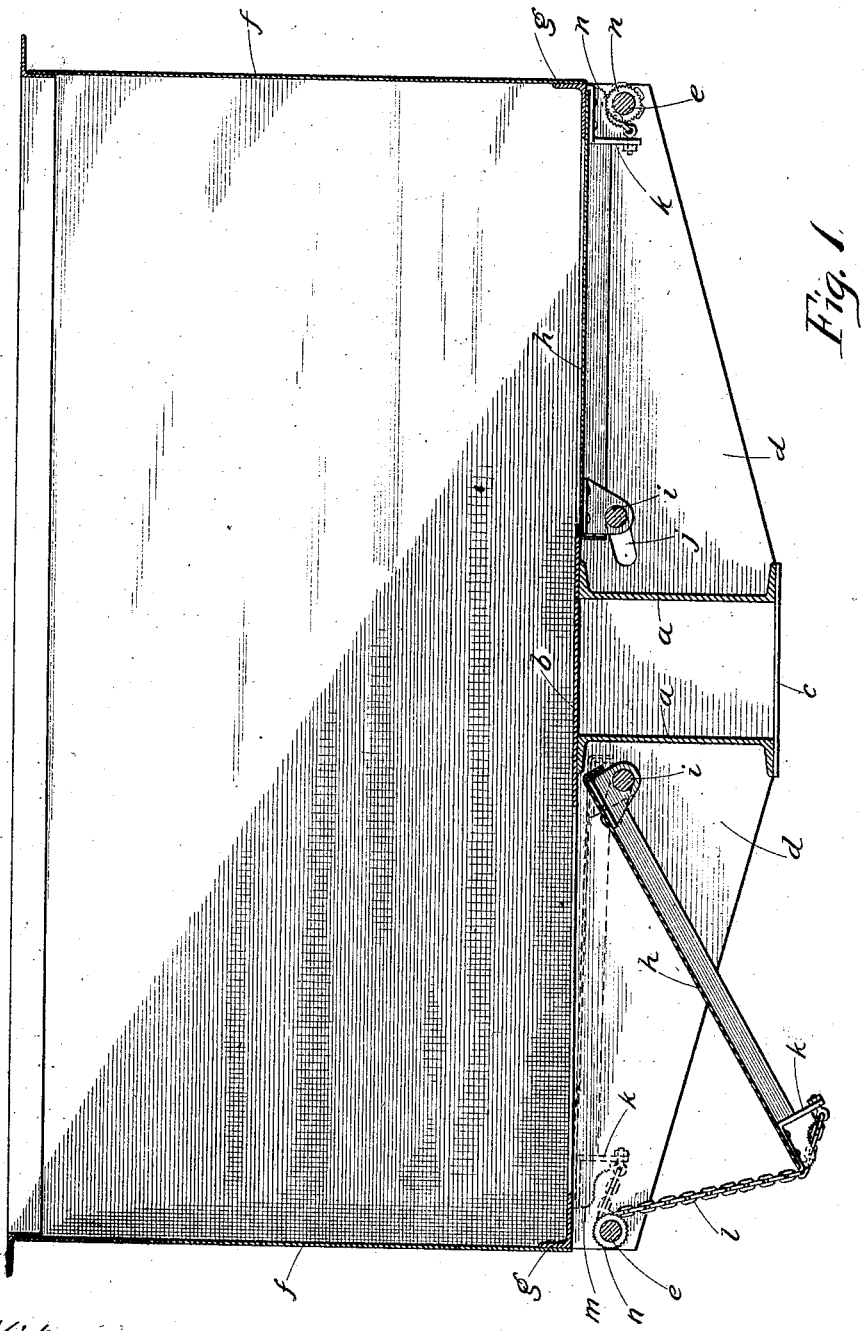

F. SEABERG.
DOOR OPERATING MECHANISM.
APPLICATION FILED SEPT. 19, 1908.

1,000,443.

Patented Aug. 15, 1911.
2 SHEETS—SHEET 2.

Witnesses:
Anna L. Walton
Edythe W. Anderson

Sheridan & Wilkinson
Frederick Seaberg Attys
Inventor.

UNITED STATES PATENT OFFICE.

FREDERICK SEABERG, OF CHICAGO, ILLINOIS, ASSIGNOR TO NATIONAL DUMP CAR COMPANY, OF CHICAGO, ILLINOIS, A CORPORATION OF MAINE.

DOOR-OPERATING MECHANISM.

1,000,443.

Specification of Letters Patent.   Patented Aug. 15, 1911.

Application filed September 19, 1908.   Serial No. 453,820.

*To all whom it may concern:*

Be it known that I, FREDERICK SEABERG, a citizen of the United States, residing at Chicago, in the county of Cook and State of Illinois, have invented certain new and useful Improvements in Door-Operating Mechanism, of which the following is a specification.

The object of my invention is to provide simple and efficient means for operating the dump doors of railway cars, and the application of my invention is described and illustrated in connection with a gondola car having its bottom substantially wholly composed of drop doors, and adapted for use either as a general service gondola car or as a dump car.

Figure 3:
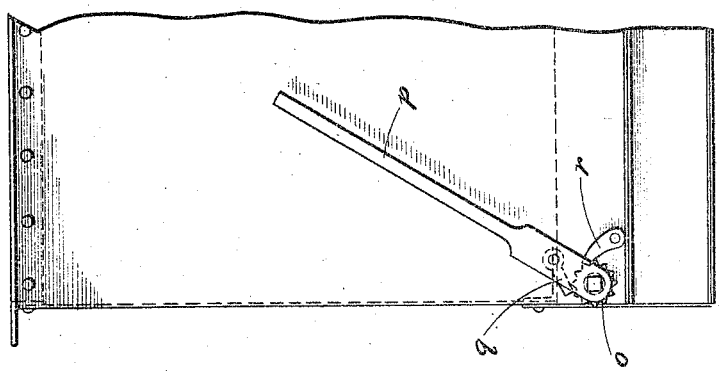
Figure 2:
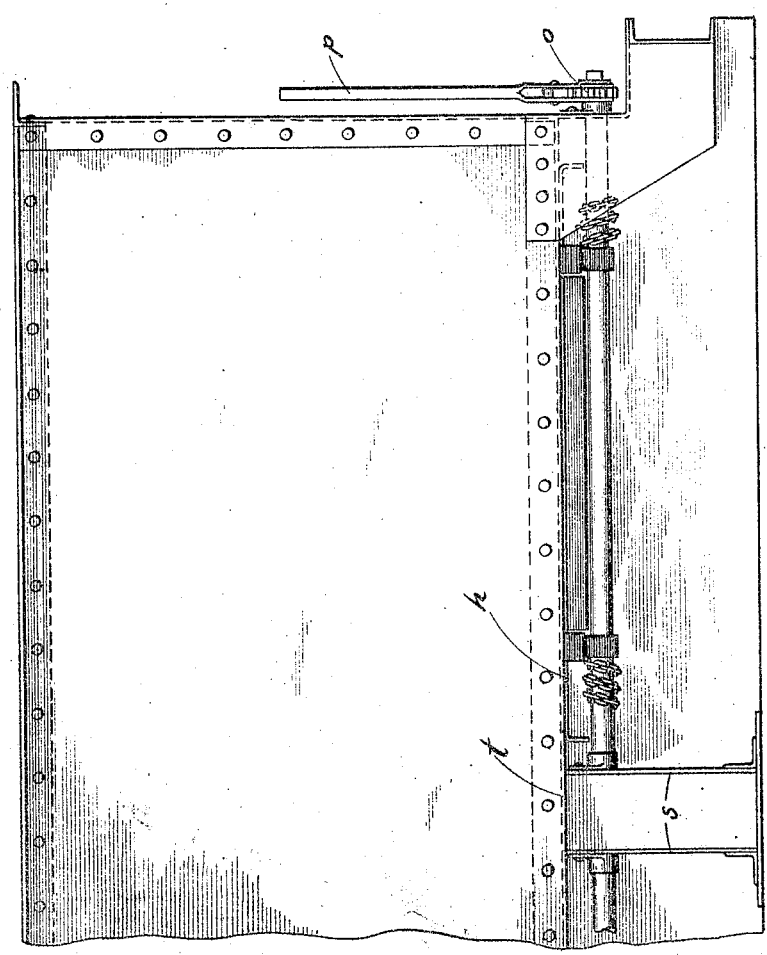

In the drawings—Figure 1 is a cross section of a car embodying my invention. Fig. 2 is a side view of a car near the end, and Fig. 3 is a view of the end of a car showing the means for rotating the shaft.

The invention may be applied to cars variously constructed. In the car illustrated in the drawings, the underframe comprises a center sill formed of two channel beams *a*, *a* connected at the top by a cover plate or floor strip *b*, and at the bottom by a plate or plates *c*, the floor plate *b* projecting beyond the center sill at either side, thus forming an overhanging floor strip against the under side of which the doors are adapted to close. Extending transversely of the car are cross bearers *d* in the outer ends of which the operating shafts *e* are journaled. In the present instance the sides *f* of the car are reinforced at their lower edges by angle irons *g*, the horizontal flanges of which project inwardly to form narrow floor strips against the under side of which the outer edges of the doors are adapted to close. It will be obvious, however, that the doors might close directly against the under edge of the car sides and that the entire car might be otherwise constructed, and still have my invention applied thereto.

The doors *h* are hinged at their inner edges, each hinge consisting of a pin *i* co-acting with a slot *j*. In the present instance the pin is mounted upon the door and the slot formed in the cross bearer, but this arrangement might be reversed and the same result attained. Slots *j* are inclined upwardly from their inner toward their outward ends and so related to the floor level that when the doors are raised and drawn outwardly so that the pins *i* occupy the outer ends of the slot the doors will lie snugly against the under surface of the car floor. The inclination of the slots *j* serves to carry the pins *i* downwardly sufficiently when the door is thrust inward to permit the doors to be turned on said pins as an axis without binding against the under surface of the floor.

Near their outer edges the doors are preferably provided with downward projections *k*, and chains *l* are connected at one end to said projections and at the opposite end to the operating shafts *e*. Upon the outer edges of the projecting parts *k*, or upon other parts of the outer edge of the door, tapered and roughened surfaces *m* are formed, and coacting roughened surfaces *n* are formed upon the shafts *e*.

In cars of the class described, four operating shafts are usually provided, two extending inwardly from each end of the car to the center thereof, and each having chains attached thereto and to three or four doors according to the length of the car and the size of the doors.

So far as my present invention is concerned, any suitable mechanism may be used for imparting rotation to the operating shafts. In the present instance I have shown a star wheel *o* secured to the operating shaft *e* and the operating lever *p* loosely mounted thereon, the operating lever being provided with a reversible pawl *q*, whereby the shaft may be rotated in either direction. Pivoted to the end of the car is a detent pawl *r* for the purpose of holding the shaft against backward rotation between the strokes of the lever when the door is being closed.

Referring to the full line open position of door *h*, shown at the left-hand of Fig. 1, it will be apparent that when the operating lever *p* is manipulated to wind the chain *l* on the shaft *e*, the door will be raised. Of course, it will be understood that two chains are preferably connected to each door, one at either side thereof. After the door has been raised from the solid line to the dotted line position at the left of Fig. 1, further rotation of the shaft *e* in counter clockwise direction will draw the door *h* bodily outward, causing the pin *i* to slide outwardly and upwardly in the slot *j* and causing the tapered and roughened surface *m* to engage the roughened surface n on the operating shaft e. By reason of the tapered form of the surface m, the outer edge of the door will be firmly wedged against the under side of the floor, and by reason of the inclined position of the slot j the inner edge of the door will be similarly brought into close contact with the under surface of the floor.

Preferably, the cross members s of the car are provided with projecting cover plates t with the under sides of which the side edges of the door will co-act, as shown in Fig. 2.

Referring to the door shown at the right-hand of Fig. 1, it will be apparent that counter clockwise rotation of the shaft e will, through engagement of the roughened part n of the shaft with the roughened edge m of the door, cause the door to slide bodily inward to a position corresponding to that shown in dotted lines at the left-hand of Fig. 1. Further rotation of the shaft e in the same direction will permit the door to drop to open position.

By my invention, I provide means for actuating a dump door between open and closed position by a chain, while at the same time relieving the chain from weight when the door is closed and sustaining the contents of a car, this result being attained by utilizing the winding shaft as a side sill and moving the door not only upwardly and downwardly but edgewise into and out of engagement with said shaft. In the present instance the edgewise movement of the door to engage and disengage the winding shaft is permitted by the sliding connection formed by the pin and slot hinge illustrated. The desired result of relieving the winding chains of the weight and of the contents of a car is attained without the introduction of any additional or complicated parts, being secured merely by imparting the necessary movement to the dump door. In this way all complicated locking mechanism is dispensed with.

I claim:

1. In a car of the class described, a floor provided with a door opening, a door, a pivotal and sliding connection between said car and door adjacent one edge of said door opening, a support adjacent the opposite edge of the door opening, and means for moving said door toward said opening and into engagement with said support.

2. In a car of the class described, a floor provided with a door opening, a door, a pin and slot hinge at one edge of said door, a support beneath the floor level and adjacent the edge of the door opening opposite said hinge, and means for moving said door pivotally toward said opening and transversely thereof to carry its free edge over said support.

3. In a car of the class described, a floor having a door opening, a rotatable shaft mounted adjacent one side of said opening, a door, a pivotal and sliding connection between said door and car, and means connecting said shaft and door, whereby rotation of said shaft imparts a pivotal movement to said door and a movement transversely of the door opening to carry the edge of said door over said shaft.

4. In a car of the class described, a floor having a door opening, a door, hinges between one edge of said door and a fixed part of the car, said hinges permitting the door to have a pivotal and a sliding movement, a rotatable supporting shaft beneath the floor level and adjacent the edge of the door opening opposite said hinges, means for rotating said shaft, and a chain connected at one end to said shaft and at the other end to said door.

5. In a dump car, a center sill, a floor provided with a door opening, a door connected at one edge to said center sill, said connection comprising means whereby said door may move pivotally toward and from said opening and may slide transversely thereof, cross beams, a shaft rotatably mounted in said cross beams adjacent the opposite edge of said door opening and spaced beneath the lower surface of the floor, a flexible connection between said shaft and said door adjacent its free edge, and means for rotating said shaft.

6. In a dump car, a floor provided with a door opening, a door mounted adjacent one edge of said opening, means whereby said door is permitted pivotal movement toward and from said opening and a sliding movement transversely thereof, a rotatable shaft mounted beneath the floor level and adjacent the opposite edge of said opening, a flexible connection between said shaft and said door adjacent its free edge, said shaft and said door adjacent its outer edge being roughened, and means for rotating said shaft.

7. In a dump car, a floor provided with a door opening, a door mounted adjacent one edge of said opening, means whereby said door has a pivotal movement toward and from said opening and a sliding movement transversely thereof, a rotatable shaft mounted beneath and spaced from the lower surface of the floor adjacent the other edge of said opening, the outer edge of said door having an inclined under surface adapted to co-act with said shaft, a flexible connection between said shaft and said door, and means for rotating said shaft.

8. In a dump car, a floor provided with a door opening, a door mounted adjacent one edge of said opening, a connection between said door and car, said connection comprising means whereby said door may be moved pivotally toward and from said opening and may have a sliding movement transversely thereof, said door having a tapered edge, a rotatable shaft beneath the floor level adjacent the opposite edge of said opening, a flexible connection between said shaft and door, and means for rotating said shaft.

9. In a car of the class described, a floor provided with a door opening, a door, a pin and slot hinge between said door and a fixed part of the car, a support adjacent the edge of the door opening opposite said hinge, and means for moving said door toward and from said door opening and transversely thereof above said support.

10. In a dump car, a floor provided with a door opening, a door, a pin and slot hinge between said door and a fixed part of the car, a rotatable shaft beneath the floor level and adjacent the edge of said door opening opposite said hinge, a flexible connection between said shaft and the free edge of said door, and means for rotating said shaft.

11. In a car of the class described, a floor provided with a door opening, a door, a pin and slot hinge between said door and a fixed part of the car, a rotatable shaft beneath the floor level and adjacent the edge of said opening opposite said hinge, and a flexible connection between said shaft and said door, said shaft and said door adjacent its outer edge being roughened.

12. In a car of the class described, a floor provided with a door opening, a door, a pin and slot hinge between said door and a fixed part of the car, a rotatable shaft beneath the floor level and adjacent the edge of said opening opposite said hinge, and a flexible connection between said shaft and said door, said shaft and said door adjacent its outer edge being roughened and tapered.

13. In a dump car, a floor provided with a door opening, a door mounted adjacent one edge of said opening, means whereby said door is permitted a pivotal movement toward and from said opening and a sliding movement transversely thereof, a rotatable shaft mounted beneath the floor level and adjacent the opposite edge of said door opening, a downward projection adjacent the free edge of said door, a flexible connection between said shaft and said downward projection, and means for rotating said shaft.

14. In a car of the class described, a floor composed substantially wholly of dump doors, a hinge for each door, said hinge permitting a pivotal and sliding movement, a support adjacent the edge of the door opening opposite the hinge, and means for moving said door pivotally toward said opening and for imparting a sliding movement thereto to bring said door into engagement with said support.

15. In a car of the class described having its floor composed substantially wholly of dump doors, a pivotal and sliding connection between each of said doors and the car frame, a rotatable shaft, and means connecting said shaft and door, whereby rotation of said shaft imparts a pivotal movement and a sliding movement to said door to carry the edge over said shaft.

16. In a car of the class described, a floor provided with door openings, a door for each of said openings, a hinge, said hinge comprising a pin and an inclined slot, a rotatable shaft adjacent the edge of the door opening opposite said hinge, a flexible connection between said shaft and door, and means for rotating said shaft.

In testimony whereof, I have subscribed my name.

FREDERICK SEABERG.

Witnesses:
 LILLIAN A. KIBBY,
 ANNA L. WALTON.